Figure 3:
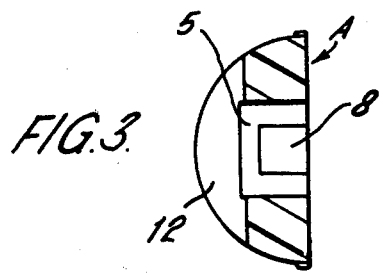
Figure 4:
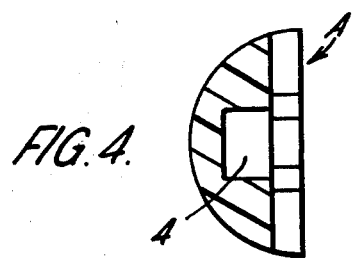
Figure 5:
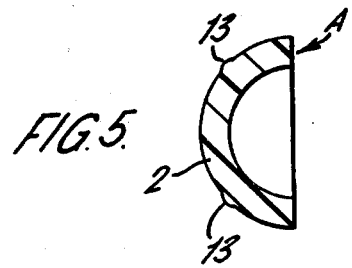

United States Patent [19]

Westran

[11] 4,207,644
[45] Jun. 17, 1980

[54] TAPE HEAD CLEANING DEVICE

[75] Inventor: William C. Westran, Seaford, England

[73] Assignee: Bib Hi-Fi Accessories Limited, Hemel Hempstead, England

[21] Appl. No.: 941,765

[22] Filed: Sep. 13, 1978

[51] Int. Cl.² .............................................. G11B 5/41
[52] U.S. Cl. ................................ 15/210 R; 15/144 R
[58] Field of Search ................. 15/144 R, 144 A, 172, 15/210 R; 274/47; 360/137; 294/53.5; 403/93, 96

[56] References Cited

U.S. PATENT DOCUMENTS

| | | | |
|---|---|---|---|
| 261,894 | 8/1882 | Albers | 294/53.5 |
| 635,744 | 10/1899 | Catudal | 403/96 X |
| 2,098,609 | 11/1937 | Bishop | 294/53.5 UX |
| 3,705,436 | 12/1972 | Holliday | 15/210 R |
| 3,886,618 | 9/1975 | Paoletti | 15/172 |
| 3,955,214 | 5/1976 | Post et al. | 15/210 R X |
| 3,964,122 | 6/1976 | Kurdy | 15/184 |
| 4,065,801 | 12/1977 | Leaming | 360/137 |
| 4,130,912 | 12/1978 | Sheppard et al. | 15/210 R |

FOREIGN PATENT DOCUMENTS 247952 11/1963 Australia .............................. 15/144 A
274951 7/1951 Switzerland .............................. 403/93

*Primary Examiner*—Philip R. Coe
*Attorney, Agent, or Firm*—Finnegan, Henderson, Farabow, Garrett & Dunner

[57] ABSTRACT

A magnetic tape head cleaning pad is mounted on the exterior of a somewhat C-shaped resilient member which is snap-fitted on one end of an elongate mounting member which at its other end is pivotally connected to one end of an elongate handle member. To secure the mounting member to the handle member in any chosen one of a number of available relative orientations, one of these members is formed with a part-ring of teeth, like part of a spur gear wheel, and the other member carries a detent member which slides transversely with respect to said member, parallel to the axis of the part ring of teeth, a projection on it lying between two adjacent teeth or not, depending on the position of the detent member.

11 Claims, 18 Drawing Figures

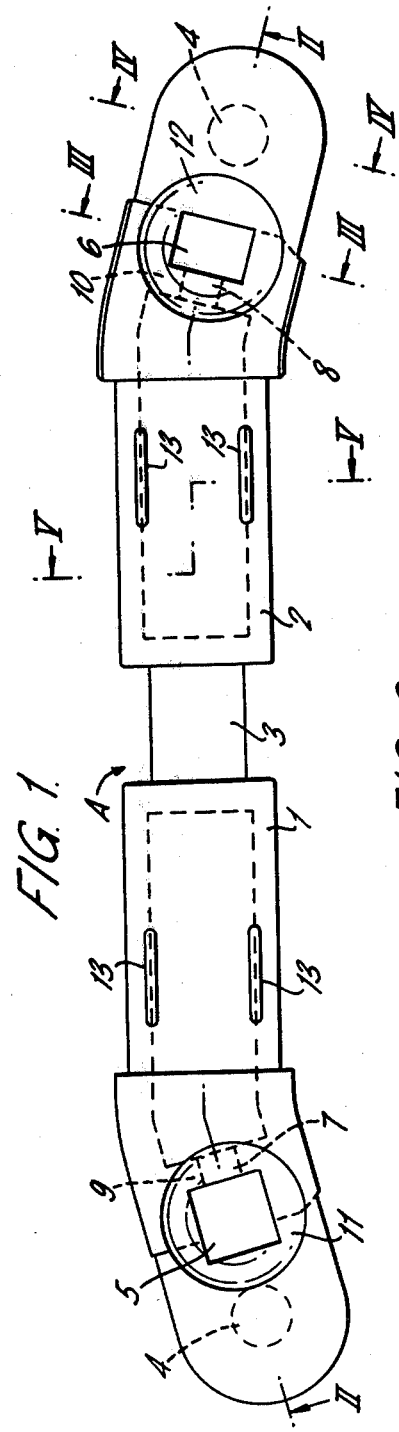
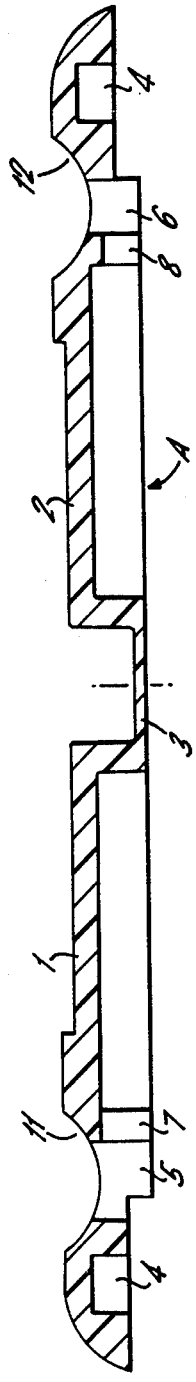
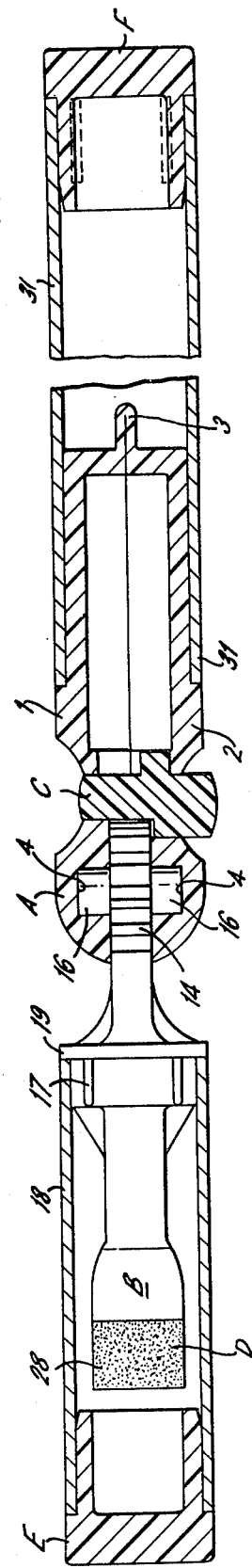

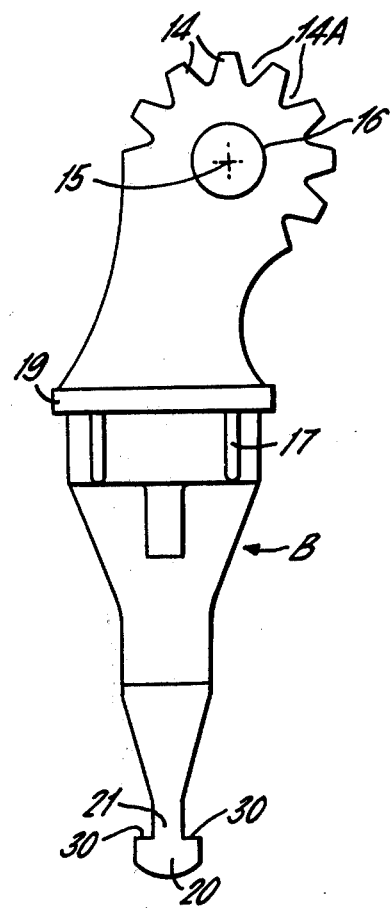
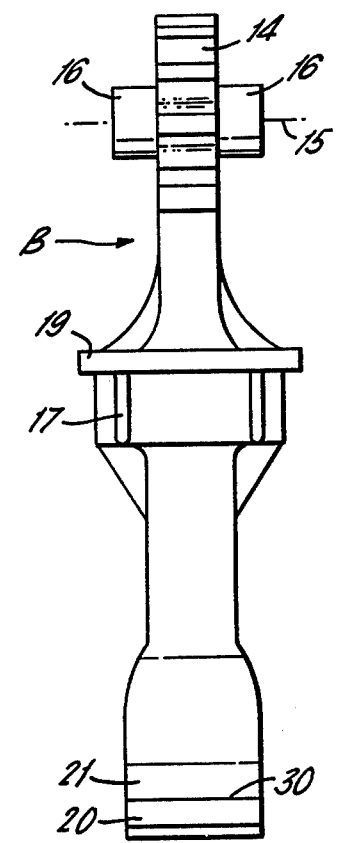

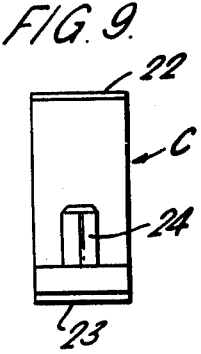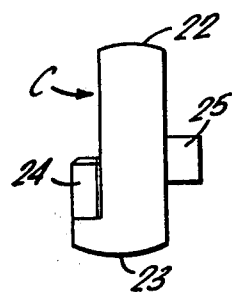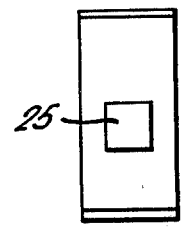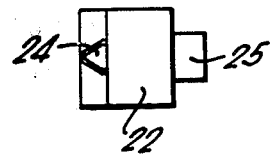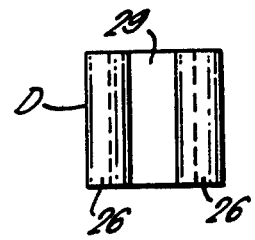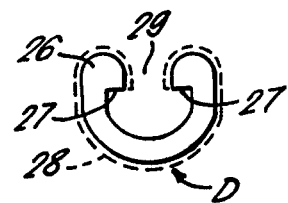

TAPE HEAD CLEANING DEVICE

According to a first aspect of the invention, there is provided a device suitable for use in cleaning magnetic heads of magnetic tape recording and/or playback instruments, the device comprising a mounting member for reception of tape head cleaning material, an elongate handle member pivotally connected to the mounting member, a part-ring of teeth on one of said members corresponding in shape to part of a spur gear wheel, a detent member mounted in the other of said members for sliding transversely with respect to it, parallel to the axis of the part-ring of teeth, between first and second positions, and a projection carried by the detent member which in the first position projects between two adjacent teeth of said part-ring of teeth, which two it is depending upon the orientation of the mounting member with respect to the handle member, and prevents a change in said orientation, and in said second position leaves the mounting member free to rotate about said axis with respect to the handle member.

According to a second aspect of the invention, the device according to the first aspect of the invention further comprises a pad of tape head cleaning material mounted on said mounting member.

Preferably, the pad is carried on the exterior of a somewhat C-shaped resilient member which is carried by the mounting member and is readily removable from it. The height of the C is preferably less than 2 cm, preferably less than 1 cm., and when this height is forcibly increased it tends to return to its original value when the resilient member is released. Preferably, the mounting member has a somewhat T-shaped part and the cross-arm of the T lies within the C and is broader than the gap in the C.

According to a third aspect of the invention, there is provided a kit of parts suitable for use in making a cleaning device which is suitable for use in cleaning magnetic heads of magnetic tape recording and/or playback instruments, the kit comprising a tape head cleaning pad carried on the exterior of a somewhat C-shaped member which is resilient and tends to return to its original height, which is below 2 cm, when its height is forcibly increased and the kit further comprising a device according to the first aspect of the invention, on said mounting member of which said somewhat C-shaped member can be snap-fitted.

According to a fourth aspect of the invention, there is provided a device which is suitable for use in cleaning magnetic heads of magnetic tape recording and/or playback instruments, the device comprising an elongate mounting member, an enlargement at one end of the member, a somewhat C-shaped resilient member snap-fitted on said one end of the member, the width of the gap of the C being less than the width of said enlargement so that said enlargement can be pulled through said gap only upon distorting said resilient member against its resilience, a tape head cleaning pad secured to the exterior face of said resilient member, a part-ring of teeth on the mounting member at its other end and corresponding in shape to part of a spur gear wheel, an elongate handle member providing bearings for rotational movement of the mounting member with respect to the handle member about the axis of said part-ring of teeth, a detent member mounted in the handle member for sliding transversely with respect to it and parallel to said axis and having two parts exposed at opposite sides of the handle member whereby by pushing said parts alternately the detent member can be moved between first and second positions, a projection carried by the detent member which in said first position projects between two of said teeth, which two it is depending upon the orientation of the mounting member with respect to the handle member, and prevents a change in said orientation, and in said second position leaves the mounting member free to rotate about said axis with respect to the handle member.

Figure 14:
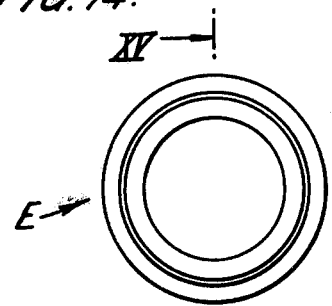
Figure 15:
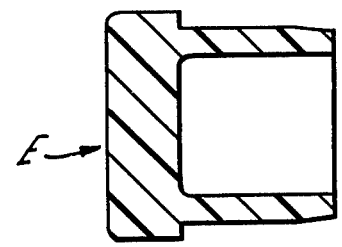
Figure 16:
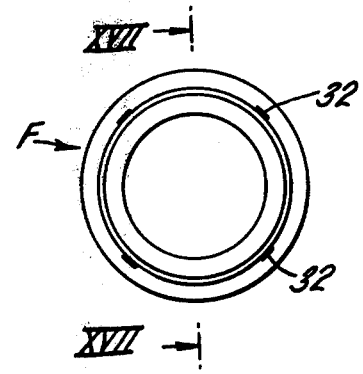
Figure 17:
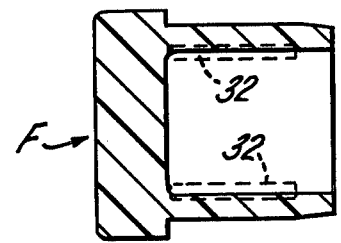

An example in accordance with the invention is described below with reference to the accompanying drawings, in which:

FIG. 1 shows a plan view of a first part of a device for use in cleaning magnetic heads of magnetic tape recording and/or playback instruments, FIGS. 2 to 5 show sectional views of the same part, taken as indicated by the lines and arrows II, III, IV and V, respectively, in FIG. 1, FIGS. 6 and 7 show two side views of a second part of the same device, FIG. 8 shows a plan view of a third part of the device, FIGS. 9 to 11 show three side views of the same part, FIG. 12 shows a plan view of a fourth part of the device, FIG. 13 shows an end view of the fourth part, FIG. 14 shows an end view of a fifth part of the device, FIG. 15 shows a sectional view of the same part, taken as indicated by the lines and arrows XV in FIG. 14, FIG. 16 shows an end view of a sixth part of the device, FIG. 17 shows a sectional view of the same part, taken as indicated by the lines and arrows XVII in FIG. 16, and FIG. 18 shows the device assembled.

FIGS. 1 to 5 show an elongate nylon moulding A of which parts 1 and 2 are trough-shaped and of semi-circular cross-section and are joined by a thinner flat portion 3. At opposite ends the moulding has similar openings in the form of blind holes 4 and their mouths can be brought face to face with their axes in alignment by folding the portion 3 at its centre, as shown in FIG. 18. Between the holes 4 and the parts 1 and 2 there are throughgoing holes 5 and 6, of which the hole 5 is broader than the hole 6, and holes 7 and 8 through end walls 9 and 10 of the trough-shaped parts 1 and 2 open into the holes 5 and 6, the upper ends 11 and 12 of which are widened. On each of the parts 1 and 2 there are two ribs 13 on the outside of the trough and extending along it.

FIGS. 6 and 7 show another elongate nylon moulding B which is formed at one end with a part-ring of seven teeth 14, like part of a spur gear wheel with axis 15, notches 14A being formed between the teeth 14. The axis 15 is also the axis of two similar stub shafts 16 which project into the holes 4 of the moulding A when this is folded as shown in FIG. 18, whereby a bearing is provided for rotation of the moulding B about the axis 15 with respect to the moulding A. The moulding B also has ribs 17 whereby this moulding is a light push fit into one end of a tubular cap 18 (FIG. 18) the end of which bears against a flange 19 on the moulding B. At the end of the moulding B remote from the teeth 14 is a somewhat T-shaped part, the cross-arm of which is referenced 20 and the stalk of which is referenced 21.

FIGS. 8 to 11 show a third elongate nylon moulding C which has convexly rounded ends 22 and 23, is broader at the lower end than at the upper end (see FIG. 10), has at one side a substantially V-shaped projection 24, which can extend partly into any chosen one of the notches 14A and has at the other side a square projection 25. The moulding C is a detent member comprising a single straight piece of material a first portion of which has a local thickening which provides the projection 24. Above this first portion, considering FIGS. 9, 10 and 11, there is a second portion of the detent member which does not have this thickening, although there is a further thickening which provides the projection 25. This moulding goes in the holes 5 and 6 of the moulding A and can be moved up and down (considering FIG. 18) by pressing on its ends 22 and 23 so that when down (as shown in FIG. 18) the projection 24 leaves the teeth 14 free to rotate with respect to the moulding A and when up the projection 24 extends partly within one of the notches 14A and prevents such rotation. The material of the moulding A which surrounds the holes 4 holds the moulding A on to the moulding B.

A fourth nylon mounting D, shown in FIGS. 12 and 13, is in the form of a short trough of somewhat C-shaped cross-section, although it has beads 26 and shoulders 27. On the exterior face of the moulding D and on the beads, but not on the shoulders, there is secured by an adhesive a pad in the form of a layer 28 of velvet or the equivalent or some other material suitable for use in cleaning magnetic heads. The moulding D is resilient so that if the height of the C (measured from left to right in FIG. 13) is forcibly increased from its normal value of less than 1 cm, it tends to decrease again and will do so when the moulding is released. The moulding D is a snap-fit on to the somewhat T-shaped part of the moulding B, i.e. the cross-arm 20 can be pushed into the opening 29 of the C, forcing the beads 26 apart, and into the C and then the beads spring back so that the shoulders 27 face shoulders 30 on the moulding B and the moulding D with its layer 28 cannot fall off the moulding B although it can be pulled off to replace it by another assembly of moulding D and layer 28 when the original is dirty.

The tubular cap 18 is made of aluminium tubing and is simply to keep the layer 28 clean when the device is not in use. At the end remote from the flange 19, a moulded nylon plug E (FIGS. 14 and 15) closes the tubing. Similar tubing forms a handle 31 much longer than the cap 28 and owing to the ribs 13 one end of this is a light push fit on to the moulding A when the latter is folded. A moulded nylon plug F (FIGS. 16 and 17) with ribs 32 on it is a light push fit into the other end of the handle 31.

By pushing the moulding C downwardly (FIG. 18), turning the moulding B to the desired position and then pushing the moulding C upwardly, any desired one of eight different angles between the axis of the moulding B and the axis of the handle 31 may be selected and the projection 24 on the moulding C prevents this angle from changing. When the moulding C is pushed downwardly, the above-mentioned second portion of it faces and lies very close to the part-ring of teeth but does not impede turning of the moulding B.

Because the angle between the parts B and 31 in the example according to FIGS. 1 to 18 can be chosen from a number of available angles and can be fixed when chosen, the device can readily be used to clean magnetic heads of a number of different kinds of magnetic tape recording and/or playback instruments. It can also be used to clean capstans, pinch wheels and tape guide pins on such instruments.

I claim:

1. A device which is suitable for use in cleaning magnetic heads of magnetic recording and/or playback instruments, the device comprising a mounting member for reception of tape head cleaning material, an elongate handle member pivotally connected to the mounting member, a part-ring of teeth on one of said members corresponding in shape to part of a spur gear wheel, a detent member mounted in the other of said members for sliding transversely with respect to it, parallel to the axis of the part-ring of teeth, between first and second positions, and a projection carried by the detent member which in the first position projects between two adjacent teeth of said part-ring of teeth, which two it is depending upon the orientation of the mounting member with respect to the handle member, and prevents a change in said orientation, and in said second position leaves the mounting member free to rotate about said axis with respect to the handle member, the detent member being a single straight piece of material, a first portion of which has a local thickening providing said projection, a second portion of the detent member beside the first portion facing and lying very close to said part-ring of teeth in the second position of the detent member.

2. A device according to claim 1 and further comprising a pad of tape head cleaning material mounted on said mounting member.

3. A device which is suitable for use in cleaning magnetic heads of magnetic tape recording and/or playback instruments, the device comprising a mounting member, a somewhat C-shaped resilient member which is carried by the mounting member and is readily removable from it, a pad of tape head cleaning material carried on the exterior of said resilient member, an elongate handle member pivotally connected to the mounting member, a part-ring of teeth on one of said members corresponding in shape to part of a spur gear wheel, a detent member mounted in the other of said members for sliding transversely with respect to it, parallel to the axis of the part-ring of teeth, between first and second positions, and a projection carried by the detent member which in the first position projects between two adjacent teeth of said part-ring of teeth, which two it is depending upon the orientation of the mounting member with respect to the handle member, and prevents a change in said orientation, and in said second position leaves the mounting member free to rotate about said axis with respect to the handle member.

4. A device according to claim 3 in which the mounting member has a somewhat T-shaped part and the cross-arm of the T lies within the C and is broader than the gap in the C.

5. A device which is suitable for use in cleaning magnetic heads of magnetic tape recording and/or playback instruments, the device comprising a mounting member for reception of tape head cleaning material, an elongate handle member pivotally connected to the mounting member, a part-ring of teeth on the mounting member corresponding in shape to part of a spur gear wheel, a detent member mounted in the handle member for sliding transversely with respect to it, parallel to the axis of the part-ring of teeth, between first and second positions, and a projection carried by the detent member which in the first position projects between two adjacent teeth of said part-ring of teeth, which two it is depending upon the orientation of the mounting member with respect to the handle member, and prevents a change in said orientation, and in said second position leaves the mounting member free to rotate about said axis with respect to the handle member, said mounting member comprising, projecting outwardly from it in opposite directions, two stub shafts which extend into openings in the handle member, the material of the handle member surrounding the openings providing bearings for the pivotal connection of the mounting member and the handle member.

6. A device according to claim 1 in which said detent member comprises two parts exposed on opposite sides of the handle member, pressure on one of these parts causing the projection to move from one of said positions to the other position and pressure on the other part causing the projection to move from said other position to said one position.

7. A device which is suitable for use in cleaning magnetic heads of magnetic tape recording and/or playback instruments, the device comprising a mounting member for reception of tape head cleaning material, an elongate handle member pivotally connected to the mounting member, a part-ring of teeth on one of said members corresponding in shape to part of a spur gear wheel, a detent member mounted in the other of said members for sliding transversely with respect to it, parallel to the axis of the part-ring of teeth, between first and second positions, and a projection carried by the detent member which in the first position projects between two adjacent teeth of said part-ring of teeth, which two it is depending upon the orientation of the mounting member with respect to the handle member, and prevents a change in said orientation, and in said second position leaves the mounting member free to rotate about said axis with respect to the handle member, the handle member consisting of two parts, one of which is elongate and carries said detent member and has been made by folding a longer elongate part in two, the other part being a tube into which said one part has been inserted.

8. A device according to claim 1 and further comprising a tubular cover provided with an end closure for fitting on the assembly of the mounting member and the handle member.

9. A kit of parts suitable for use in making a cleaning device which is suitable for use in cleaning magnetic heads of magnetic tape recording and/or playback instruments, the kit comprising a tape head cleaning pad carried on the exterior of a somewhat C-shaped member which is resilient and tends to return to its original height, which is below 2 cm, when its height is forcibly increased and the kit further comprising a mounting member on which said somewhat C-shaped member can be snap-fitted an elongate handle member pivotally connected to the mounting member, a part-ring of teeth on one of said members corresponding in shape to part of a spur gear wheel, a detent member mounted in the other of said members for sliding transversely with respect to it, parallel to the axis of the part-ring of teeth, between first and second positions, and a projection carried by the detent member which in the first position projects between two adjacent teeth of said part-ring of teeth, which two it is depending upon the orientation of the mounting member with respect to the handle member, and prevents a change in said orientation, and in said second position leaves the mounting member free to rotate about said axis with respect to the handle member.

10. A device which is suitable for use in cleaning magnetic heads of magnetic tape recording and/or playback instruments, the device comprising an enlongate mounting member, an enlargement at one end of the member, a somewhat C-shaped resilient member snap-fitted on said one end of the member, the width of the gap of the C being less than the width of said enlargement so that said enlargement can be pulled through said gap only upon distorting said resilient member against its resilience, a tape head cleaning pad secured to the exterior face of said resilient member, a part-ring of teeth on the mounting member at its other end and corresponding in shape to part of a spur gear wheel, an elongate handle member providing bearings for rotational movement of the mounting member with respect to the handle member about the axis of said part-ring of teeth, a detent member mounted in the handle member for sliding transversely with respect to it and parallel to said axis and having two parts exposed at opposite sides of the handle member whereby by pushing said parts alternately the detent member can be moved between first and second positions, a projection carried by the detent member which in said first position projects between two adjacent teeth of said part-ring of teeth, which two it is depending upon the orientation of the mounting member with respect to the handle member, and prevents a change in said orientation, and in said second position leaves the mounting member free to rotate about said axis with respect to the handle member.

11. A device which is suitable for use in cleaning magnetic heads of magnetic tape recording and/or playback instruments, the device comprising a mounting member, tape head cleaning material mounted on said mounted member, an elongate handle member pivotally connected to the mounting member, a part-ring of teeth on one of said members corresponding in shape to part of a spur gear wheel, a detent member mounted in the other of said members for sliding transversely with respect to it, parallel to the axis of the part-ring of teeth, between first and second positions, and a projection carried by the detent member which in the first position projects between two adjacent teeth of said part-ring of teeth, which two it is depending upon the orientation of the mounting member with respect to the handle member, and prevents a change in said orientation, and in said second position leaves the mounting member free to rotate about said axis with respect to the handle member.

* * * * *